United States Patent
Dada et al.

(10) Patent No.: US 9,493,185 B2
(45) Date of Patent: Nov. 15, 2016

(54) LINKS-VXI SUSPENSION SYSTEM

(71) Applicant: Tempus Motor Works LLC, Ojai, CA (US)

(72) Inventors: Winthrop Dada, Denver, CO (US); Cameron Carlson, Ojai, CA (US); Aaron Prichard, Ojai, CA (US); Max Sluiter, Thousand Oaks, CA (US); Lydia Bostrom-Dada, Chico, CA (US)

(73) Assignee: Tempus Motor Works LLC, Ojai, CA (US)

( * ) Notice: Subject to any disclaimer, the term of this patent is extended or adjusted under 35 U.S.C. 154(b) by 109 days.

(21) Appl. No.: 14/214,186

(22) Filed: Mar. 14, 2014

(65) Prior Publication Data

US 2014/0262586 A1    Sep. 18, 2014

Related U.S. Application Data

(60) Provisional application No. 61/785,614, filed on Mar. 14, 2013.

(51) Int. Cl.
| | |
|---|---|
| *B60G 3/12* | (2006.01) |
| *B60G 7/02* | (2006.01) |
| *B60G 21/02* | (2006.01) |
| *B62D 7/18* | (2006.01) |
| *B62D 7/08* | (2006.01) |
| *B60G 15/06* | (2006.01) |
| *B60K 17/04* | (2006.01) |
| *B62D 61/00* | (2006.01) |

(52) U.S. Cl.
CPC . *B62D 7/18* (2013.01); *B60G 3/12* (2013.01); *B60G 7/02* (2013.01); *B60G 15/067* (2013.01); *B60G 21/023* (2013.01); *B60K 17/04* (2013.01); *B62D 7/08* (2013.01); *B60G 2204/128* (2013.01); *B60G 2300/07* (2013.01); *B62D 61/00* (2013.01)

(58) Field of Classification Search
CPC .. B60K 17/30; B60K 17/043; B60K 17/342; B60K 17/36; B62D 7/18; B60G 3/20; B60G 3/202; B60G 36/205; B60G 3/22
USPC .......................... 180/252–255, 357, 366, 373
See application file for complete search history.

(56) References Cited

U.S. PATENT DOCUMENTS

| | | | | |
|---|---|---|---|---|
| 1,627,225 | A * | 5/1927 | Babel | B60K 17/36 180/24.11 |
| 3,653,455 | A * | 4/1972 | Hetteen | B60F 3/0061 152/384 |
| 3,809,004 | A * | 5/1974 | Leonheart | B60F 3/0007 180/21 |
| 6,433,687 | B1 * | 8/2002 | Yamaashi | G01S 5/0027 340/286.14 |
| 7,673,719 | B2 * | 3/2010 | Buschena | B60G 3/145 180/344 |
| 8,235,404 | B2 * | 8/2012 | Dada | B60G 3/26 280/124.127 |
| 2005/0247507 | A1 * | 11/2005 | Fecteau | B62K 5/027 180/357 |

\* cited by examiner

*Primary Examiner* — Anne Marie Boehler
(74) *Attorney, Agent, or Firm* — Brian T. Duke; Nixon Peabody LLP

(57) ABSTRACT

In various embodiments, the present invention teaches the use of two or more "floating pivot points" in a trailing/leading arm suspension system. A complimentary steering system is also described herein. The present invention eliminates a number of significant shortcomings of the traditional trailing/leading arm suspension type, thereby offering substantial performance improvements.

12 Claims, 7 Drawing Sheets

LINKS-VXI SUSPENSION SYSTEM

CROSS-REFERENCE TO RELATED APPLICATIONS

This non-provisional application claims the priority benefit of U.S. Provisional Patent Application No. 61/785,614, filed on Mar. 14, 2013, which is incorporated herein by reference in its entirety.

FIELD OF THE INVENTION

The present invention generally relates to vehicle suspension systems and apparatuses.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

There are many types of suspension systems for vehicles. Among the types commonly used are leading/trailing arm suspensions. While these suspensions are commonly used because they confer certain advantages, they are also associated with numerous shortcomings.

First, the wheelbase usually changes more than desired as the suspension cycles from full droop to full compression. The scope for controlling that change for benefit (e.g. anti-squat or anti-dive forces) is limited, especially for off-road applications where high ground clearance is required. Generally, pro-dive is desirable for rough road applications because the tire can move backwards a bit when it encounters a bump, however, pro-dive normally requires a pivot point so low that ground clearance is compromised and/or the tradeoff of anti-dive when the suspension goes into droop.

Second, lateral placement of the wheel is compromised by the long lever-arm of traditional designs, leading to suspension deflection and thereby "deflection-steer."

Third, significant toe angle change during vertical wheel motion (henceforth referred to as bump steer) is present in most "high-travel" leading/trailing arm designs utilizing traditional steering systems (i.e. rack and pinion or recirculating ball steering) with one tie rod on each side of the vehicle. This is because the tie-rod and suspension arm each travel in arcs on different planes.

Fourth, as the vertical suspension travel to track width ratio increases, the half-shaft axles become the limiting factor due to the high angularity plunge travel required.

Considering all of the performance issues associated with traditional suspensions, there is clearly a need in the art for improved suspension systems.

SUMMARY OF THE INVENTION

In various embodiments, the invention teaches an apparatus including a first set of components, which include: a first belt-pulley-arm (BPA) including a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA; a first geared-hub-arm (GHA), including a first end, a second end, a central region, and one or more first GHA gears housed within the first GHA, wherein one of the first GHA gears includes a first drive shaft which is configured to interact with a first wheel of a vehicle; a first upper triangulated arm (UTA), including a first end, a second end, a central region, a long axis, and a short axis, wherein the second end of the first UTA is configured to attach to a chassis of the vehicle; and a first belt; wherein (1) the first end of the first BPA is pivotally attached to the central region of the first GHA; (2) the first end of the first UTA is pivotally attached to the first end of the first GHA; (3) the first belt circumscribes the long axis of the first BPA, and is configured to simultaneously interact with the first gear of the first BPA and one or more first GHA gears of the first GHA, thereby associating rotational motion between said gears.

In some embodiments, the apparatus further includes a second set of components, including: a second BPA, including a first end, a second end, a central region, a long axis, and a short axis; a second GHA, including a first end, a second end, a central region, and one or more second GHA gears housed within the second GHA, wherein one of the second GHA gears includes a second drive shaft extending in the same direction as the first drive shaft and configured to interact with a second wheel of the vehicle; a second UTA, including a first end, a second end, a central region, a long axis, and a short axis, wherein the second end of the second UTA is configured to attach to the chassis on the same side as the first UTA; and a second belt; wherein (1) the first end of the second BPA is pivotally attached to the central region of the second GHA; (2) the first end of the second UTA is pivotally attached to the first end of the second GHA; (3) the second belt circumscribes the long axis of the second BPA, and is configured to simultaneously interact with the first gear of the first BPA and one or more second GHA gears of the second GHA, thereby associating rotational motion of said gears; and (4) the second end of the second BPA and the second end of the first BPA are pivotally attached to one another.

In some embodiments, the apparatus further includes a third and a fourth set of components, wherein the third and fourth sets of components are identical to the first and second sets of components (described above), respectively, and (1) the third and fourth sets of components are oriented as mirror images of the first and second sets of components, respectively; (2) the third and fourth sets of components are connected to one another in the same manner as the first and second sets of components are connected to one another; and (3) the third and fourth sets of components are configured to be attached to the chassis in the same manner as the first and second sets of components, but on the opposite side of the chassis.

In some embodiments, the apparatus further includes a chassis of a vehicle, wherein the chassis of the vehicle is pivotally attached to each of the UTAs.

In various embodiments, the apparatus includes a component used to attach the BPAs to the chassis of the vehicle.

In some embodiments, the apparatus includes a substantially linear component that traverses the chassis of the vehicle and connects to each gear on the second end of each of the first BPA and the third BPA, respectively.

In various embodiments, the apparatus includes one or more motors configured to induce rotation in one or more of the gears.

In some embodiments, the apparatus includes a quantity of wheels equal to the quantity of drive shafts, wherein each of the wheels is configured to interact with one of the drive shafts.

In some embodiments, the apparatus includes a first steering knuckle configured to interact with a first wheel, and a second steering knuckle configured to interact with a second wheel; wherein the second steering knuckle is situated substantially parallel to the first steering knuckle.

In some embodiments, the apparatus includes components for actuating the position of the steering knuckles. One of skill in the art would recognize that this could be accomplished in any of a number of ways, using any of a number of components. In certain embodiments, the components for actuating the position of each steering knuckle include: (1) a steering servo arm; (2) a steering push-pull rod; (3) a bell crank; and (4) a tie rod; wherein the steering servo arm is connected to the steering push-pull rod, which is in turn connected to the bell crank, which is in turn connected to the tie rod, which is in turn connected to the steering knuckle, such that a change in a position of the steering servo arm results in a change in a position of the steering knuckle with which it is associated via intervening components 2-4.

In some embodiments, the apparatus further includes a first set of spring/dampers (SD), including: (1) a first SD including a first end and a second end, and (2) a second SD, including a first end and a second end, wherein (a) the first end of the first SD is attached to a region near the first end of the first BPA; (b) the first end of the second SD is attached to a region near the first end of the second BPA; and (c) the second end of the first SD and the second end of the second SD are connected to one another; and a second set of SDs, including: (1) a third SD including a first end and a second end, and (2) a fourth SD, including a first end and a second end, wherein (a) the first end of the third SD is attached to a region near the first end of the third BPA; (b) the first end of fourth SD is pivotally attached to a region near the first end of the fourth BPA; and (c) the second end of the third SDA and the second end of the fourth SDA are connected to one another.

In some embodiments, the invention teaches a kit, including: mechanical components, including: a first belt-pulley-arm (BPA), including a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA; a first geared-hub-arm (GHA), including a first end, a second end, a central region, and one or more first GHA gears housed within the first GHA, wherein one of the first GHA gears includes a first drive shaft which is configured to interact with a first wheel of a vehicle; a first upper triangulated arm (UTA), including a first end, a second end, a central region, a long axis, and a short axis, wherein the second end of the first UTA is configured to attach to a chassis of the vehicle; a first belt; wherein (1) the first end of the first BPA is configured to pivotally attach to the central region of the first GHA; (2) the first end of the first UTA is configured to pivotally attach to the first end of the first GHA; (3) the first belt is configured to circumscribe the long axis of the first BPA, and is configured to simultaneously interact with the first gear of the first BPA and one or more first GHA gears of the first GHA, thereby associating rotational motion between said gears. In some embodiments, the kit further includes a second BPA, including a first end, a second end, a central region, a long axis, and a short axis; a second GHA, including a first end, a second end, a central region, and one or more second GHA gears housed within the second GHA, wherein one of the second GHA gears includes a second drive shaft extending in the same direction as the first drive shaft and configured to interact with a second wheel of the vehicle; a second UTA, including a first end, a second end, a central region, a long axis, and a short axis, wherein the second end of the second UTA is configured to attach to the chassis on the same side as the first UTA; and a second belt; wherein (1) the first end of the second BPA is configured to pivotally attach to the central region of the second GHA; (2) the first end of the second UTA is configured to pivotally attach to the first end of the second GHA; (3) the second belt is configured to circumscribe the long axis of the second BPA, and is configured to simultaneously interact with the first gear of the first BPA and one or more second GHA gears of the second GHA, thereby associating rotational motion of said gears; and (4) the second end of the second BPA and the second end of the first BPA are configured to pivotally attach to one another. In some embodiments, the kit further includes instructions for the use thereof.

In various embodiments, the invention teaches a method, including operating a vehicle that includes: a first belt-pulley-arm (BPA), including a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA; a first geared-hub-arm (GHA), including a first end, a second end, a central region, and one or more first GHA gears housed within the first GHA, wherein one of the first GHA gears includes a first drive shaft which is configured to interact with a first wheel of a vehicle; a first upper triangulated arm (UTA), including a first end, a second end, a central region, a long axis, and a short axis, wherein the second end of the first UTA is configured to attach to a chassis of the vehicle; a first belt; wherein (1) the first end of the first BPA is pivotally attached to the central region of the first GHA; (2) the first end of the first UTA is pivotally attached to the first end of the first GHA; (3) the first belt circumscribes the long axis of the first BPA, and is configured to simultaneously interact with the first gear of the first BPA and one or more first GHA gears of the first GHA, thereby associating rotational motion between said gears. In some embodiments, the vehicle further includes a second BPA, including a first end, a second end, a central region, a long axis, and a short axis; a second GHA, including a first end, a second end, a central region, and one or more second GHA gears housed within the second GHA, wherein one of the second GHA gears comprises a second drive shaft extending in the same direction as the first drive shaft and configured to interact with a second wheel of the vehicle; a second UTA, including a first end, a second end, a central region, a long axis, and a short axis, wherein the second end of the second UTA is configured to attach to the chassis on the same side as the first UTA; and a second belt; wherein (1) the first end of the second BPA is pivotally attached to the central region of the second GHA; (2) the first end of the second UTA is pivotally attached to the first end of the second GHA; (3) the second belt circumscribes the long axis of the second BPA, and is configured to simultaneously interact with the first gear of the first BPA and one or more second GHA gears of the second GHA, thereby associating rotational motion of said gears; and (4) the second end of the second BPA and the second end of the first BPA are pivotally attached to one another.

BRIEF DESCRIPTION OF THE DRAWINGS

Exemplary embodiments are illustrated in the referenced figures. It is intended that the embodiments and figures disclosed herein are to be considered illustrative rather than restrictive.

DETAILED DESCRIPTION OF THE INVENTION

Figure 1:
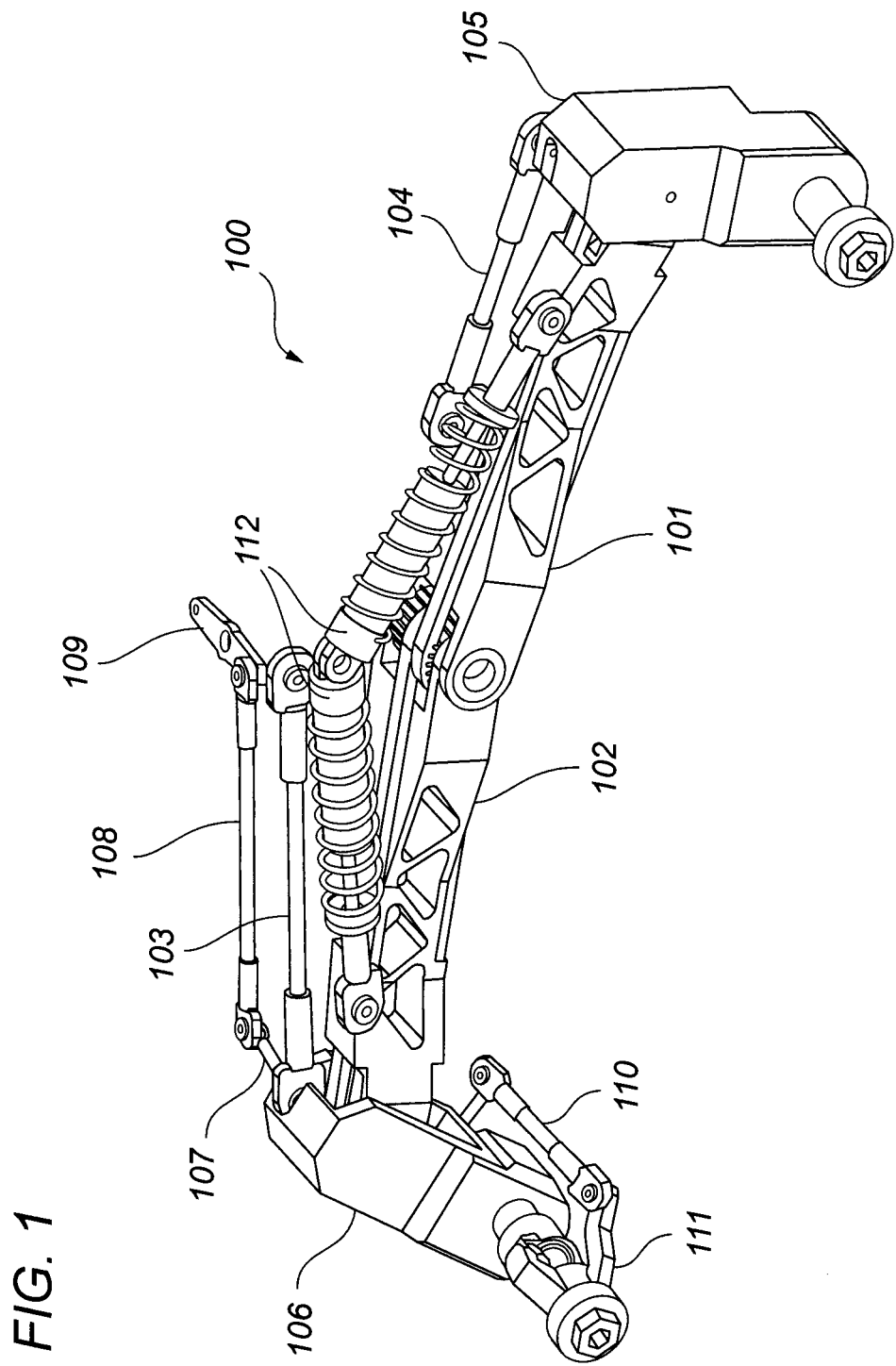
FIG. 1 depicts, in accordance with an embodiment of the invention, a view of one half of a vehicle suspension system with a steering mechanism incorporated therein.
Figure 2:
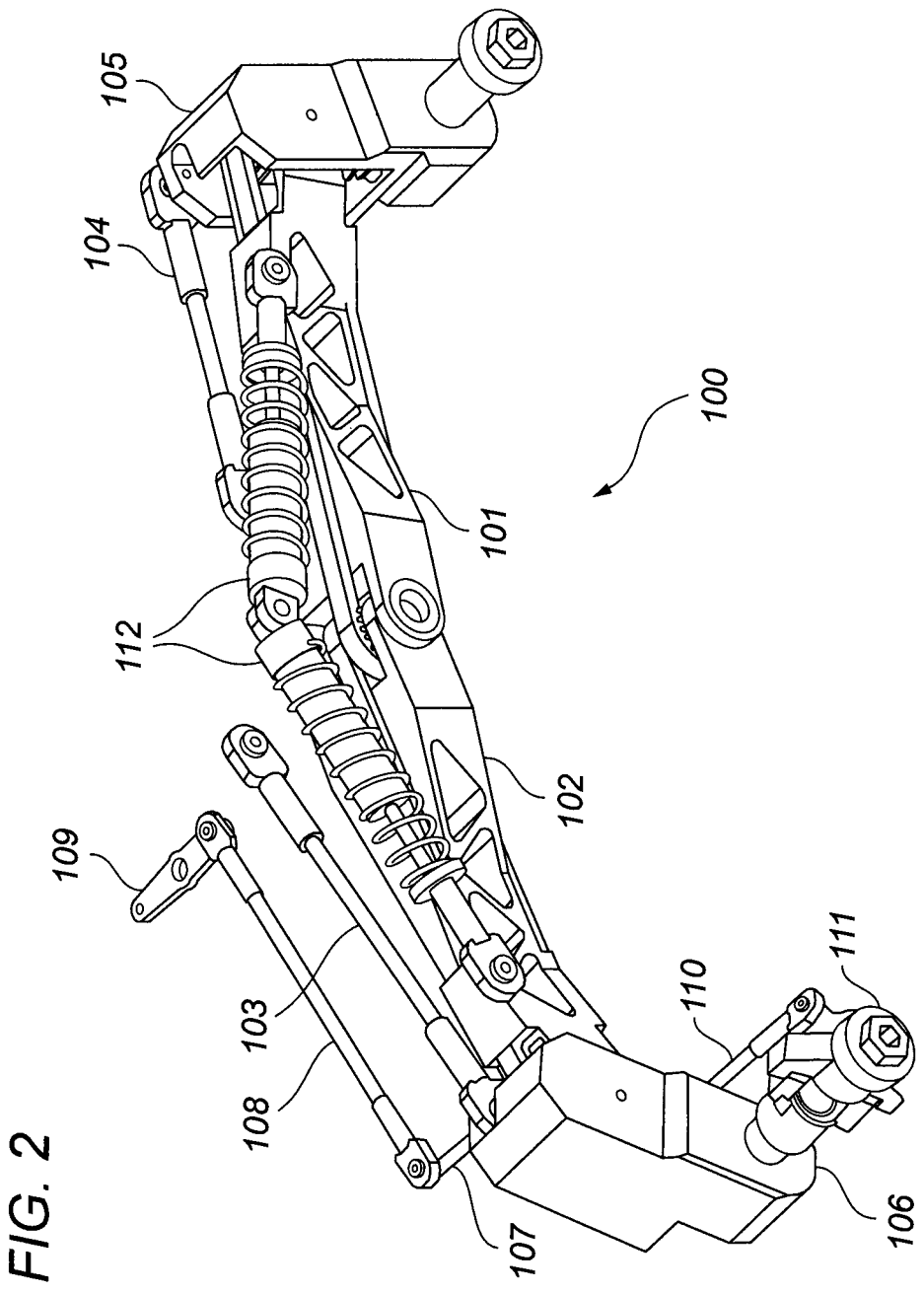
FIG. 2 depicts, in accordance with an embodiment of the invention, a view of one half of a vehicle suspension system with a steering mechanism incorporated therein.

All references cited herein are incorporated by reference in their entirety as though fully set forth. Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described.

In some embodiments, the numbers expressing properties such as dimensions, shapes, and so forth, used to describe and claim certain embodiments of the invention are to be understood as being modified by the term "about." Accordingly, in some embodiments, the numerical parameters set forth in the written description and attached claims are approximations that can vary depending upon the desired properties sought to be obtained by a particular embodiment. Notwithstanding that the numerical ranges and parameters setting forth the broad scope of some embodiments of the application are approximations, the numerical values set forth in the specific examples are reported as precisely as practicable.

The suspension and steering systems of the present invention include significant modifications to the suspension systems described in U.S. patent application Ser. No. 12/984,569, as well as U.S. Pat. No. 8,235,404, each of which is incorporated by reference herein in its entirety as though fully set forth. In some embodiments, the present invention involves the use of two or more "floating pivot points" in a trailing/leading arm suspension system. A complimentary steering system is also described herein. The present invention eliminates the significant shortcomings of the trailing/leading arm suspension type (described in greater detail below), thereby offering substantial performance improvements.

The benefits of using a suspension system with two or more floating pivot points are significant. First, it allows for the reduction and control of wheelbase change to produce the desired pro-dive side view kinematics throughout suspension travel and without compromising ground clearance. Second, it allows for improved lateral rigidity of a trailing/leading arm design. Third, it reduces and in some cases eliminates bump steer. Fourth, it simplifies the driveline. In fact, in some embodiments of the invention the system incorporates the use of a novel belt or chain-driven drive line that needs only one differential and no transfer-case in order to yield 4-wheel drive. Fifth, the inventive apparatus and system increases driveline reliability. As the Links-VXI does not employ half-shaft axles, it eliminates weakness in the driveline normally associated with high-travel independent suspensions. One of skill in the art would readily appreciate that the inventive suspension apparatus and system can be used to create an extraordinarily high-travel suspension for "off road" use. In addition, the extremely compact dimensions, robust driveline and adaptability for addition of a "camber-link" make the design useful for traditional road-going vehicles as well.

Figure 5:
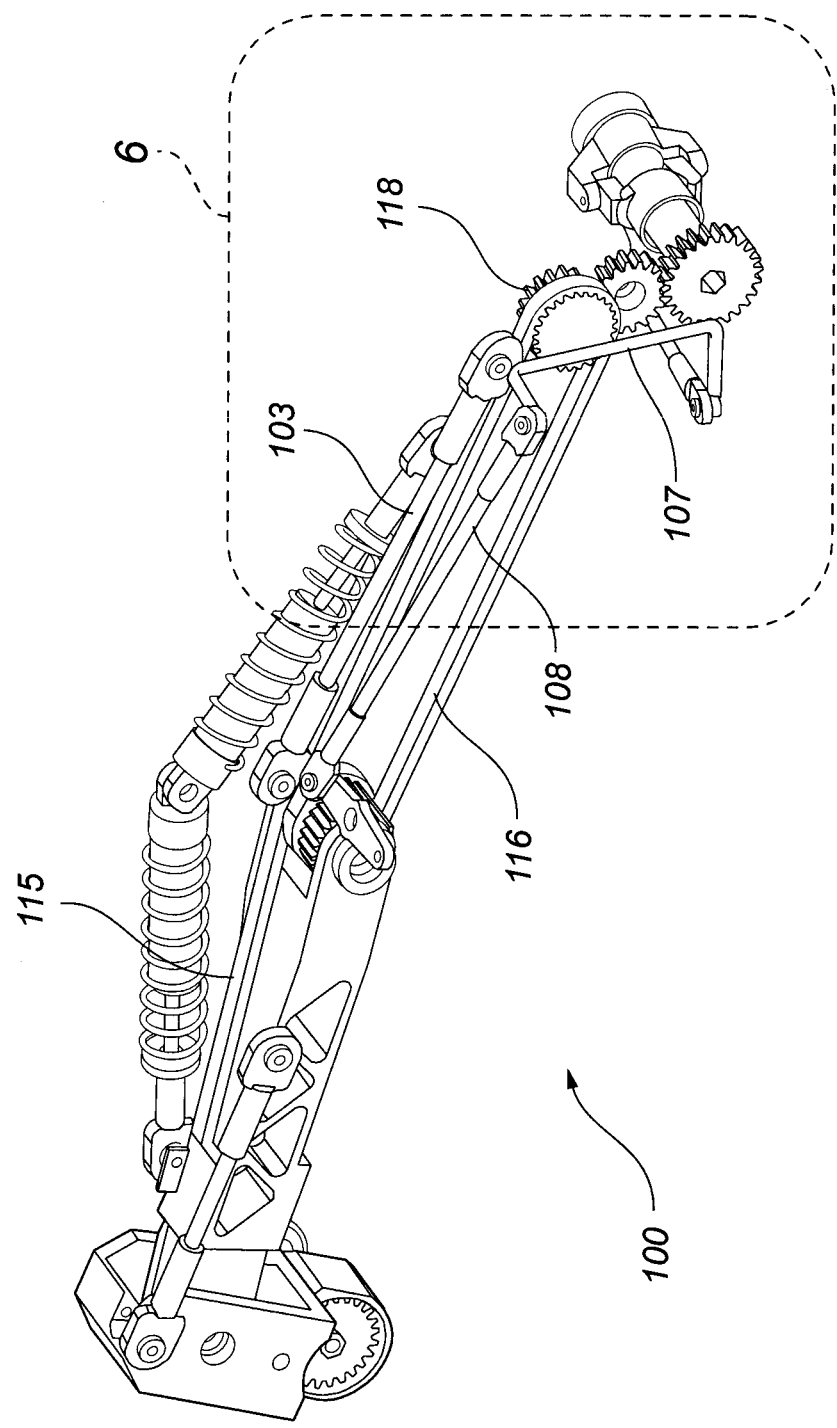
FIG. 5 depicts, in accordance with an embodiment of the invention, a view of the interaction between (1) the BPA, (2) the inside of the GHA (with the case of the GHA removed for clarity), (3) the UTA, (4) the steering components, and (5) the gears.
Figure 6:
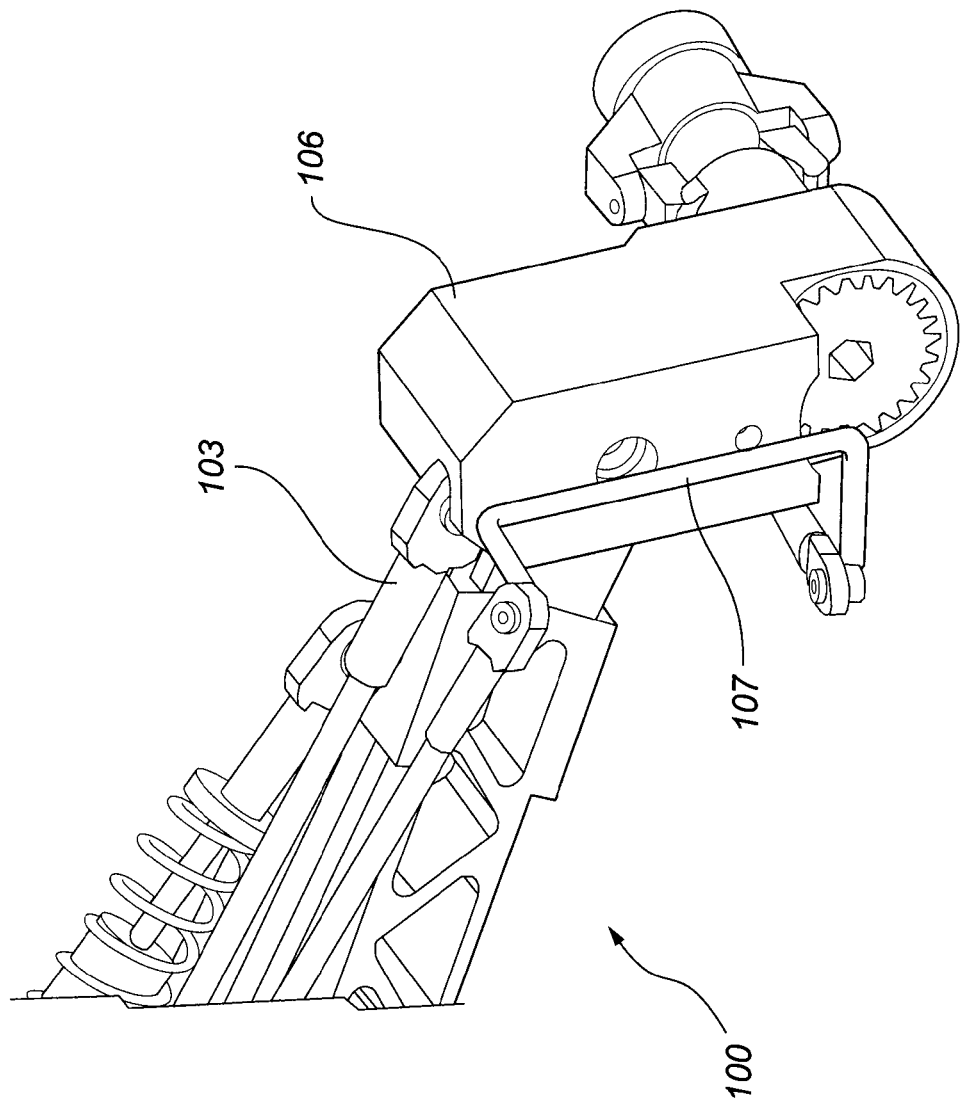
FIG. 6 depicts, in accordance with an embodiment of the invention, a close up view of the portion of the steering mechanism containing the bell crank.
Figure 7:
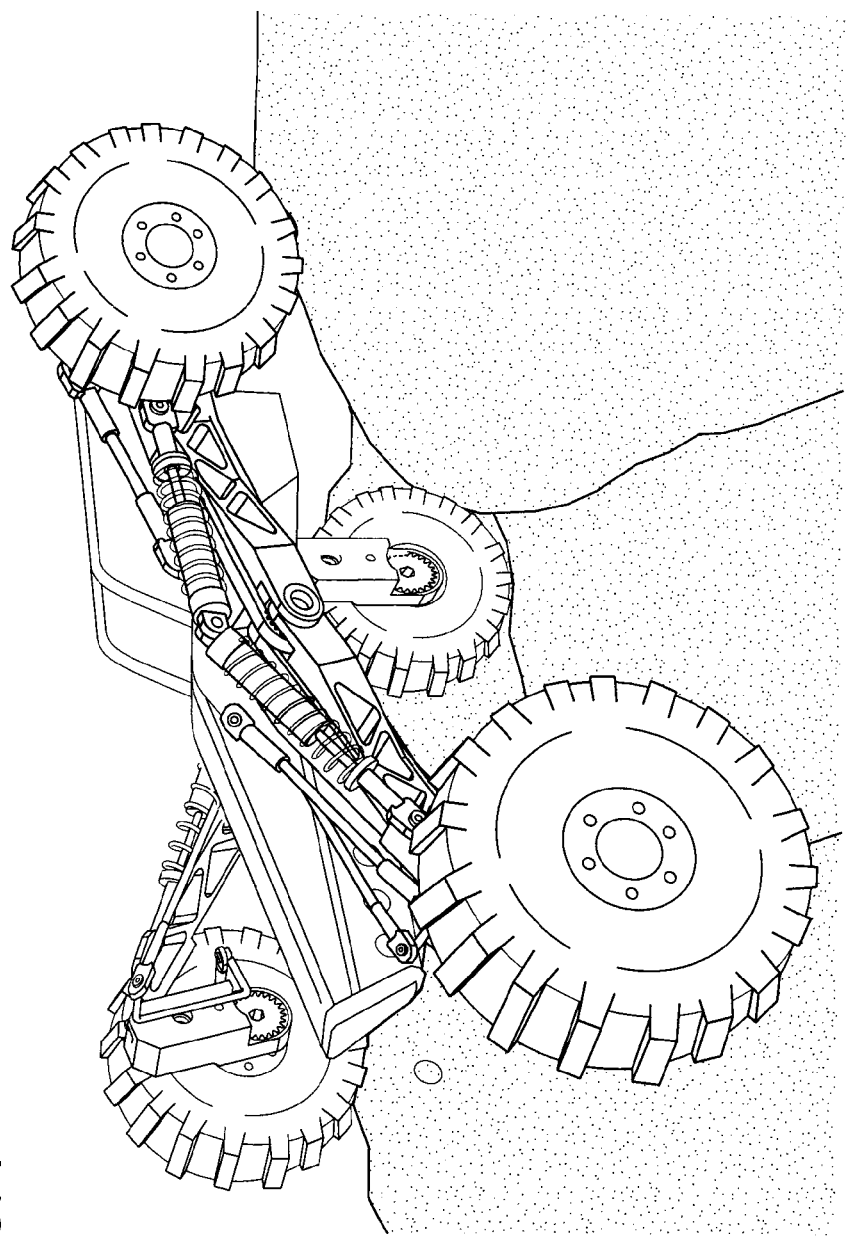
FIG. 7 depicts, in accordance with an embodiment of the invention, a drawing of a vehicle outfitted with a suspension system, and climbing a rock.

Each major element of the suspension-link components are named and described below. The "belt-pulley-arms" ("BPAs") form the primary link, as exemplified by the BPAs 101/102 of FIG. 1 (depicting suspension 100). This general feature is incorporated in many trailing/leading arm suspension systems, but in the present invention they also serve as a link to run belts and pulleys (or chains and sprockets) through which torque is transferred to the wheels, as exemplified by the belts 115/116 of FIG. 5. This link forms the first of the two floating pivot points at one end and is attached to the chassis at the other end, as demonstrated in FIG. 3. The "upper-triangulated-arm" ("UTA") forms the second of the two floating pivot points at one end and are attached to the chassis at the other end, as exemplified by the UTAs 103/104 shown in FIG. 3, attached to the chassis 114. One of skill in the art would readily appreciate that one or more UTAs can be used per quadrant of a vehicle, depending upon the specific performance characteristics desired. This component can be triangulated with the BPAs in plain view, thereby increasing lateral rigidity of the overall suspension. If two UTAs are used per side, then each UTA is triangulated itself. The "geared-hub-arm" ("GHA") attaches at its top to the UTA, at its middle to the BPA, and at its bottom to the steering knuckle, drive-shaft, and wheel, as exemplified by the relative positions of the GHAs 105/106, UTAs 103/104 and BPAs 101/102 of FIG. 1. The GHA also serves as a key driveline component along with the BPAs. In an exemplary embodiment, the GHAs employ gears, but one of skill in the art would readily appreciate that belts and pulleys, drive shafts or chains and sprockets or similar configurations could be used in the alternative to achieve substantially the same results.

For purposes of the present invention, the steering system components can include, but are in no way limited to, one or more of the following: (1) a steering servo; (2) a push-pull rod; (3) a bell-crank; (4) a tie-rod; and (5) the knuckle and steering-arm. These components, and their relationship to one another in certain embodiments, are exemplified by the steering servo arm 109, steering push-pull rod 108, bell crank 107, tie rod 110, and steering knuckle 111 shown in FIG. 1.

In some embodiments, the invention is an apparatus that includes a first set of components, which include: (1) a first belt-pulley-arm (BPA), including a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA; (2) a first geared-hub-arm (GHA), including a first end, a second end, a central region, and one or more first GHA gears housed within the first GHA, wherein one of the first GHA gears includes a first drive shaft which is configured to interact with a first wheel of a vehicle; (3) a first upper triangulated arm (UTA), including a first end, a second end, a central region, a long axis, and a short axis, wherein the second end of the first UTA is configured to attach to a chassis of the vehicle; and (4) a first belt. In some embodiments, (a) the first end of the first BPA is pivotally attached to the central region of the first GHA; (b) the first end of the first UTA is pivotally attached to the first end of the first GHA; (c) the first belt circumscribes the long axis of the first BPA, and is configured to simultaneously interact with the first gear of the first BPA and one or more first GHA gears of the first GHA, thereby associating rotational motion between said gears.

In some embodiments, the apparatus includes a second set of components, which include (1) a second BPA, including a first end, a second end, a central region, a long axis, and a short axis; (2) a second GHA, including a first end, a second end, a central region, and one or more second GHA gears housed within the second GHA; wherein one of the second GHA gears includes a second drive shaft extending in the same direction as the first drive shaft and configured to interact with a second wheel of the vehicle; (3) a second UTA, including a first end, a second end, a central region, a long axis, and a short axis; wherein the second end of the second UTA is configured to attach to the chassis on the same side as the first UTA; and (4) a second belt. In some embodiments, (1) the first end of the second BPA is pivotally attached to the central region of the second GHA; (2) the first end of the second UTA is pivotally attached to the first end of the second GHA; (3) the second belt circumscribes the long axis of the second BPA, and is configured to simultaneously interact with the first gear of the first BPA and one or more second GHA gears of the second GHA, thereby associating rotational motion of said gears; and (4) the second end of the second BPA and the second end of the first BPA are pivotally attached to one another. Merely by way of non-limiting example, the interaction between a belt 116 and a gear 118 of the GHA can be seen in FIG. 5.

In some embodiments, the apparatus also includes a third and a fourth set of components, wherein the third and fourth sets of components are identical to the first and second sets of components, respectively. In some embodiments, (1) the third and fourth sets of components are oriented as mirror images of the first and second sets of components, respectively; (2) the third and fourth sets of components are connected to one another in the same manner as the first and second sets of components are connected to one another; and (3) the third and fourth sets of components are configured to be attached to the chassis in the same manner as the first and second sets of components, but on the opposite side of the chassis. In some embodiments, the apparatus further includes a chassis of a vehicle, wherein the chassis of the vehicle is pivotally attached to each of the UTAs. In some embodiments, the apparatus further includes one or more components for attaching the BPAs to the chassis of the vehicle. In certain embodiments, the apparatus includes a substantially linear component that traverses the chassis of the vehicle and connects to each gear on the second end of each of the first BPA and the third BPA, respectively. One of skill in the art would readily appreciate that this component could be made of metal or any other suitable material. In some embodiments, the apparatus includes one or more motors configured to induce rotation in one or more of the gears. In some embodiments, the apparatus includes a plurality of wheels, each configured to interact with one of the drive shafts. In some embodiments, the apparatus includes a first steering knuckle configured to interact with a first wheel, and a second steering knuckle configured to interact with a second wheel, wherein the second steering knuckle is situated substantially parallel to the first steering knuckle. In some embodiments, the apparatus includes components for actuating the position of the steering knuckles. In various embodiments, the components used for actuating the position of each steering knuckle include: (1) a steering servo arm, (2) a steering push-pull rod, (3) a bell crank, and (4) a tie rod. In some embodiments, the steering servo arm is connected to the steering push-pull rod, which is in turn connected to the bell crank, which is in turn connected to the tie rod, which is in turn connected to the steering knuckle. In some embodiments, the steering mechanism is designed such that a change in the position of the steering servo arm results in a change in the position of the steering knuckle with which it is associated via intervening components 2-4. In some embodiments, the apparatus further includes a first set of spring/dampers (SD), which include a first SD including a first end and a second end, and a second SD, including a first end and a second end. In some embodiments, (1) the first end of the first SD is attached to a region near the first end of the first BPA; (2) the first end of the second SD is attached to a region near the first end of the second BPA; and (3) the second end of the first SD and the second end of the second SD are connected to one another. In certain embodiments, the first and/or second ends of the first and/or second SD are pivotally connected to their respective points of attachment described above. In some embodiments, the apparatus includes a second set of SDs, which include a third SD including a first end and a second end; and a fourth SD, including a first end and a second end. In some embodiments, (1) the first end of the third SD is attached to a region near the first end of the third BPA; (2) the first end of fourth SD is attached to a region near the first end of the fourth BPA; and (3) the second end of the third SD and the second end of the fourth SD are connected to one another. In certain embodiments, the first and/or second ends of the third and/or fourth SD are pivotally connected to their respective points of attachment described above.

In some embodiments, the invention teaches a kit that includes mechanical components. In some embodiments, the mechanical components include: a first belt-pulley-arm (BPA), including a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA; a first geared-hub-arm (GHA), including a first end, a second end, a central region, and one or more first GHA gears housed within the first GHA, wherein one of the first GHA gears includes a first drive shaft which is configured to interact with a first wheel of a vehicle; a first upper triangulated arm (UTA), including a first end, a second end, a central region, a long axis, and a short axis, wherein the second end of the first UTA is configured to attach to a chassis of the vehicle; a first belt; wherein (1) the first end of the first BPA is configured to pivotally attach to the central region of the first GHA; (2) the first end of the first UTA is configured to pivotally attach to the first end of the first GHA; (3) the first belt is configured to circumscribe the long axis of the first BPA, and is configured to simultaneously interact with the first gear of the first BPA and one or more first GHA gears of the first GHA, thereby associating rotational motion between said gears. In some embodiments, the kit further includes a second BPA, including a first end, a second end, a central region, a long axis, and a short axis; a second GHA, including a first end, a second end, a central region, and one or more second GHA gears housed within the second GHA, wherein one of the second GHA gears includes a second drive shaft extending in the same direction as the first drive shaft and configured to interact with a second wheel of the vehicle; a second UTA, including a first end, a second end, a central region, a long axis, and a short axis, wherein the second end of the second UTA is configured to attach to the chassis on the same side as the first UTA; and a second belt; wherein (1) the first end of the second BPA is configured to pivotally attach to the central region of the second GHA; (2) the first end of the second UTA is configured to pivotally attach to the first end of the second GHA; (3) the second belt is configured to circumscribe the long axis of the second BPA, and is configured to simultaneously interact with the first gear of the first BPA and one or more second GHA gears of the second GHA, thereby associating rotational motion of said gears; and (4) the second end of the second BPA and the second end of the first BPA are configured to pivotally attach to one another.

In some embodiments, the kit further includes the third and/or fourth sets of components described above. One of skill in the art would readily appreciate that various combinations of any or all of the various components and sets of components described above could be included in a kit. All of those combinations are contemplated within the invention. In some embodiments, the kit further includes instructions for the use of the components included in the kit. In some embodiments, instructions for assembly of the components, and/or attachment of the components to a vehicle are also included in the kit.

In various embodiments, the invention teaches a method, including operating a vehicle that includes: a first belt-pulley-arm (BPA), including a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA; a first geared-hub-arm (GHA), including a first end, a second end, a central region, and one or more first GHA gears housed within the first GHA, wherein one of the first GHA gears includes a first drive shaft which is configured to interact with a first wheel of a vehicle; a first upper triangulated arm (UTA), including a first end, a second end, a central region, a long axis, and a short axis, wherein the second end of the first UTA is configured to attach to a chassis of the vehicle; a first belt; wherein (1) the first end of the first BPA is pivotally attached to the central region of the first GHA; (2) the first end of the first UTA is pivotally attached to the first end of the first GHA; (3) the first belt circumscribes the long axis of the first BPA, and is configured to simultaneously interact with the first gear of the first BPA and one or more first GHA gears of the first GHA, thereby associating rotational motion between said gears. In some embodiments, the vehicle further includes a second BPA, including a first end, a second end, a central region, a long axis, and a short axis; a second GHA, including a first end, a second end, a central region, and one or more second GHA gears housed within the second GHA, wherein one of the second GHA gears comprises a second drive shaft extending in the same direction as the first drive shaft and configured to interact with a second wheel of the vehicle; a second UTA, including a first end, a second end, a central region, a long axis, and a short axis, wherein the second end of the second UTA is configured to attach to the chassis on the same side as the first UTA; and a second belt; wherein (1) the first end of the second BPA is pivotally attached to the central region of the second GHA; (2) the first end of the second UTA is pivotally attached to the first end of the second GHA; (3) the second belt circumscribes the long axis of the second BPA, and is configured to simultaneously interact with the first gear of the first BPA and one or more second GHA gears of the second GHA, thereby associating rotational motion of said gears; and (4) the second end of the second BPA and the second end of the first BPA are pivotally attached to one another. In some embodiments, the vehicle further includes the third and fourth sets of components described above. In some embodiments, the method includes operating a vehicle that further includes any of the additional components that can be added to or used to modify the suspension system as described herein.

As indicated above, the present invention addresses many of the shortcomings of a traditional (single tie-rod per side) steering system used with a trailing/leading arm design. This is at least in part accomplished for the reasons set forth below.

First, because of the reduced wheelbase change during vertical suspension motion, the correct Ackermann geometry for zero-scrub turning does not change significantly. This means that there is no need for controlling bump steer such that it is present and beneficial when turning, but not present during straight-ahead running, a requirement which would be very hard to achieve to the degree desired with a fully mechanical, unassisted steering system. Next, triangulated UTAs, such as those described above, increase the lateral rigidity of the suspension, thereby reducing deflection-steer. Finally, when the steering linkages pivot on the same plane as the rest of the suspension linkages, and the steering pivots are coaxial with the suspension pivot points (UTA or BPA) in side view, bump steer is eliminated (when the car is running straight ahead). When the wheels are steered, the steering system is no longer exactly coaxial with the rest of the suspension, but with careful selection of intermediate lever/crank ratios this effect is minimized, along with bump steer. This system can be used to introduce the reverse Ackermann steering geometry desired for on-road cars relying primarily on slip angle to generate lateral force for turning.

Additional significant features that can be incorporated in the inventive design can include, but are in no way limited to, those described below.

First, half-shaft axles can be eliminated. By running belts mounted on pulleys (or chains/sprockets or gears or drive shafts) down the BPAs and GHAs, the inventive design eliminates the primary source of driveline weakness inherent in high travel independent suspensions. The constant velocity (CV) joint (only 1 CV joint instead of two) angle is fixed at zero degrees of input with relation to the chassis and must only accommodate steering-angle input. This is in contrast to all other independent suspensions in which the axles must respond to input angles that change as the suspension cycles from full compression to full droop.

Second, the manner in which the springs/dampers can be laid-over sideways (as exemplified by the springs/damper assembly 112 depicted in FIG. 1), can yield a very compact package with a very low center of gravity. It can also result in a motion ratio that allows the use of more conventional linear dampers and coil springs, rather than requiring extremely high travel parts.

Third, the system allows for four-wheel drive with only one differential. Whereas traditional 4-wheel drive systems need 3 components to function (1 transfer case and 2 differentials), the inventive suspension and driveline system needs only 1 differential to enable 4-wheel drive, thus greatly simplifying the design and reducing parts and weight of the vehicle. In addition, the need for front-to-rear wheel speed differential is reduced on loose surfaces, which is one of many environments in which the design is particularly well suited to function. For navigating rocky terrain, an additional environment in which the use of the inventive design is particularly advantageous, speeds are low enough and the road surface complex enough that the front-to-rear wheels speed differential is a minor issue. Since the driveline of certain embodiments of the inventive design immediately splits torque left-right it can use only 1 (lockable) differential (combined with the transmission for the first Links-VXI design) to enable true 4-wheel drive.

Fourth, by situating the driveline axes (of the timing belt pulleys, gears, or chain sprockets) coaxial with the suspension linkages, and by using cogged belts, the need for belt tensioners is eliminated, resulting in a reduction in weight and cost without sacrificing performance. By having fixed length driveline sections, gears can be used in the BPAs or GHAs and if shafts are employed they do not need to accommodate plunge travel, which would add weight and friction via the required linear bearings or splines.

Figure 3:
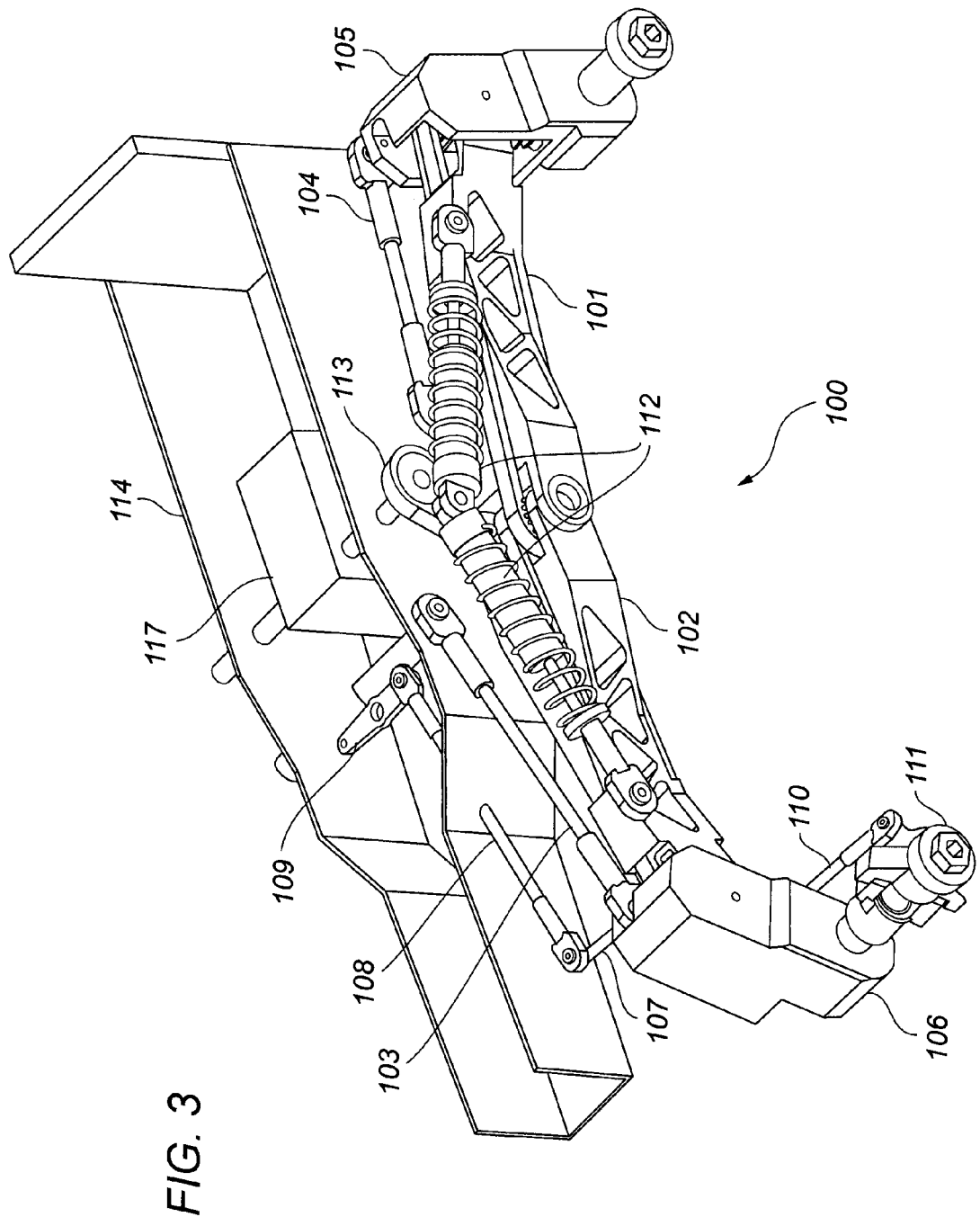
FIG. 3 depicts, in accordance with an embodiment of the invention, an alternate view of one half of a vehicle suspension system, attached to the chassis of a vehicle.
Figure 4:
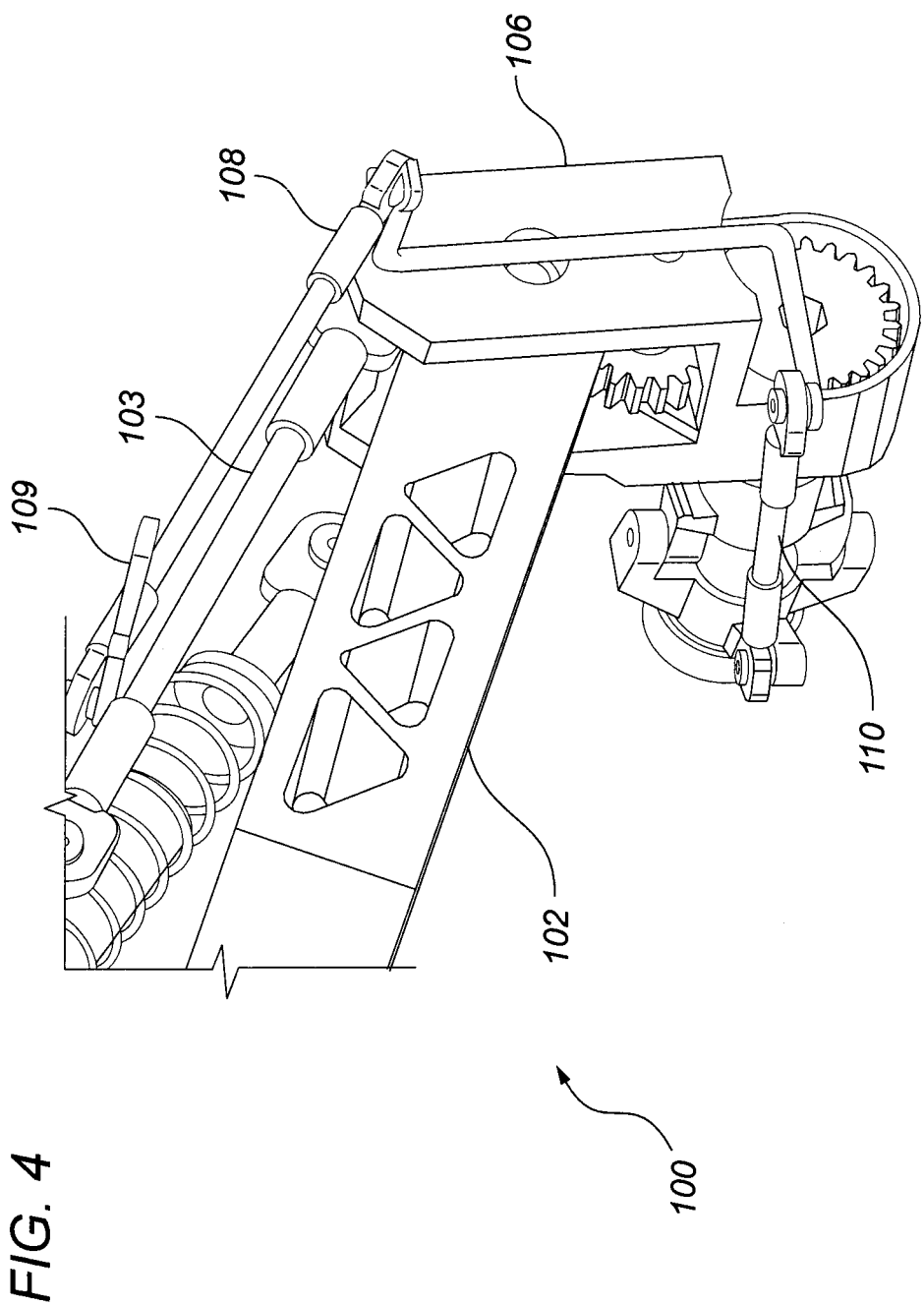
FIG. 4 depicts, in accordance with an embodiment of the invention, a view of the interaction between (1) the belt-pulley-arm (BPA), (2) the geared-hub arm (GHA), (3) the upper triangulated arm (UTA), (4) the steering components, and (5) the gears.

Fifth, speed reduction (torque increase) or speed increase (torque reduction) within the BPAs and/or GHAs are possible. By distributing the speed reduction among all the driveline sections, the number of gear reduction stages needed in the chassis-mounted gearbox is reduced. This makes the chassis-mounted gearbox smaller, simpler and lighter. One of skill in the art would readily appreciate that a gearbox could be mounted in any of a number of positions on a vehicle with the inventive suspension system. Merely by way of non-limiting example, the gearbox/motor 117 could be mounted as shown in FIG. 3. One or more additional gears and belts can be used to translate the power generated by the motor into rotational motion of the wheels, through the intervening gears previously described. Merely by way of non-limiting example, an additional belt and gear assembly 113 can be attached to a drive shaft of the motor 117 in order to impart rotational motion to the first gear of the BPA 102.

Importantly, the location of the pivot points on the UTA and the BPA can be used to alter the geometry of the suspension. In fact, one of skill in the art would recognize that many variations are possible, each yielding different wheel paths for various applications. Wheelbase change can be largely eliminated with the proper geometry, based upon the length of the suspension arms, length of distance between the pivot points of the BPA and UTA, and the location fore/aft/up/down between said pivot points. By varying the length and location of the UTA/BPA some wheelbase change can also be "designed in," where desirable, for instance if anti-dive or anti-squat geometry were required.

In some embodiments, the length of the GHA can also be altered from shorter to longer and the distance between the pivot points where the BPA and UTA meet the GHA (the "floating pivot points") can also be varied from shorter to longer. One of skill in the art would readily appreciate that these configurations will alter the wheel paths created by the suspension linkages.

In some embodiments, the suspension is adapted for a two-wheel vehicle, such as a bicycle, a motorcycle, and the like. Motorcycles commonly use a trailing-arm design in the rear suspension and a fork in the front. The traditional trailing-arm design on motorcycles and bicycles suffer from the same wheelbase change problem inherent in the designs described above. Furthermore, suspension forks used in the front of two-wheel vehicles result in friction and deflection. By incorporating the inventive suspension system on two-wheel vehicles, both problems are eliminated.

In order to make a two-wheel (and two-wheel drive) vehicle from the inventive four-wheel design, the rear-suspension from one side (i.e. the right rear) can be combined with the front-suspension from the other side. This combination yields a two-wheel vehicle (ie. motorcycle or bicycle) in which the wheelbase change is virtually eliminated as the suspension cycles from full compression to full droop. One advantage of this configuration is that it significantly improves vehicle stability.

In some embodiments, the steering arm push/pull rods are moved to be in-line with the BPAs rather than the UTAs. For smaller vehicles, UTAs can be used instead of the BPAs for packaging/space issues. For larger vehicles, the inverse can be chosen, as it shortens the length of the vertical component of the steering bell-crank, thus making the bell-crank stronger, more rigid, smaller and lighter.

The steering system described herein can be applied to any trailing/leading arm suspension, including a leading-arm design. In these instances the UTAs, GHAs and the drive system (belts/chains/gears/shafts) are eliminated entirely.

In some embodiments, push-pull rods have "rack" gearing added to them at the end where the rods meet the chassis and a "pinion" gear added to replace the steering servo arm. This can serve to reduce bump-steer.

In some embodiments, a camber-link arm (as described in U.S. patent application Ser. No. 12/984,569) is added to the bell-crank of the steering, allowing the wheels to go into positive and negative camber when pushed/pulled by the bell-crank. This configuration can aid cornering grip significantly as the camber-link eliminates the effect of body-roll on wheel-camber relative to the road or driving surface.

In some embodiments, chains, drive shafts (with bevel gears), or parallel gear trains are substituted for the belts on the BPAs. The gear trains can each be a 1:1 overall ratio, or one or more stages can incorporate speed reduction or speed increase. Due to the length of the BPAs, more than two stages of gear reduction can be employed to transfer the power along them. This allows for very large speed reduction or speed increase ratios. Additional stages of belt or chain drives can be incorporated to increase the speed reduction/increase if the desired ratio is not possible with a single stage.

In some embodiments, the GHA (Geared-Hub-Arms) can be driven by belts, chains, drive-shafts, gears or the like. In some embodiments, one to three gears are employed. In some embodiments, the rotation of the belts/chains/drive-shafts of the BPAs is reversed when employing a 2-gear GHA.

In some embodiments, the design includes rear-steer. In some embodiments, the design includes 4-wheel steer. This can reduce the turning-radius, and keep both inside and both outside wheels travelling on the same arc, thereby rotating at exactly the same speed, and eliminating the tire scrub or driveline windup that would result on a high-friction surface, such as tarmac, when not using a differential between the front and rear wheels. In some embodiments, the rear steering is tuned to the particular oversteer/understeer characteristics of the vehicle, and would benefit from the ability to change its character depending on speed, terrain/road surface conditions, and steering angle.

In some embodiments, twin-motors (left and right) are employed, thereby eliminating the mechanical differential entirely and allowing for electronic torque-vectoring to accommodate the differing speeds of the inside and outside wheels, as well as adding a yaw moment into or out of the turn to either make the vehicle more agile or to help recover from an imminent spin.

In some embodiments, clutches are employed to disengage any of the 4 wheels. This configuration can be used to create a front or rear-wheel drive vehicle. One of skill in the art would readily appreciate that this would improve efficiency, as well as rock-climbing performance, where front-wheel drive is sometimes preferable for pulling the vehicle over a steep embankment.

In some embodiments, the exemplary central drive-shaft (where the BPAs meet in the middle of the chassis) is split in two, one front and one rear. This configuration is advantageous for applications where less wheel-travel is required, as it inherently yields more interior space in the chassis. In some embodiments, either two separate motors are used front/rear or a drive mechanism (belts, chains, shafts or gears) is used to transfer the torque from the front central-drive to the rear central-drive or vice versa.

In some embodiments, torsion or leaf-springs are employed instead of the coil-springs. In some embodiments, rotary dampers are used, and inverters are added for vehicles designed for certain applications (e.g. road racing).

In summary, the present invention offers many advantages over prior leading/trailing arm suspension designs, and virtually any other suspension type. Embodiments of the invention are as strong and robust as any solid beam axle design, but offer fully independent operation and all the benefits that go along with it. The present invention further allows for a largely fixed wheelbase and track-width. The invention also eliminates the driveline weaknesses of all previous independent suspension designs, namely the half-shaft CV joints, thereby yielding a very strong and durable driveline. By combining the suspension-linkages, springs/dampers and driveline into one cohesive system, the inventive apparatus is very compact considering the substantial high wheel-travel. In fact, by using the inventive design on an off-road vehicle, 60-70" or more of wheel travel can be achieved, an amount virtually unprecedented by any suspension type (and certainly any fully independent suspension) used in off-road, rock crawling or military vehicles.

In addition to all of the aforementioned advantages, the inventive suspension system also greatly increases the lateral rigidity of leading/trailing arm suspensions, a known weakness of traditional versions of those designs. Importantly, the present invention also solves the problem of bump-steer inherent in prior leading/trailing arm suspension designs.

The various methods and techniques described above provide a number of ways to carry out the invention. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. An apparatus comprising a first set of components, comprising:
    a first belt-pulley-arm (BPA), comprising a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA;
    a first geared-hub-arm (GHA), comprising a first end, a second end, a central region, and one or more first GHA gears housed within the first GHA, wherein one of the first GHA gears comprises a first drive shaft which is configured to interact with a first wheel of a vehicle;
    a first upper triangulated arm (UTA), comprising a first end, a second end, a central region, a long axis, and a short axis, wherein the second end of the first UTA is configured to attach to a chassis of the vehicle; and
    a first belt; wherein (1) the first end of the first BPA is pivotally attached to the central region of the first GHA; (2) the first end of the first UTA is pivotally attached to the first end of the first GHA; (3) the first belt circumscribes the long axis of the first BPA, and is configured to associate rotational motion between the first gear of the first BPA and a gear of the first GHA and a second set of components comprising:
    a second BPA, comprising a first end, a second end, a central region, a long axis, and a short axis;
    a second GHA, comprising a first end, a second end, a central region, and one or more second GHA gears housed within the second GHA, wherein one of the second GHA gears comprises a second drive shaft extending in the same direction as the first drive shaft and configured to interact with a second wheel of the vehicle;
    a second UTA, comprising a first end, a second end, a central region, a long axis, and a short axis, wherein the second end of the second UTA is configured to attach to the chassis on the same side as the first UTA; and
    a second belt, wherein (1) the first end of the second BPA is pivotally attached to the central region of the second GHA; (2) the first end of the second UTA is pivotally attached to the first end of the second GHA; (3) the second belt circumscribes the long axis of the second BPA, and is configured to associate rotational motion between the first gear of the first BPA and a gear of the second GHA; and (4) the second end of the second BPA and the second end of the first BPA are pivotally attached to one another.

2. The apparatus of claim 1, further comprising a third and a fourth set of components, wherein the third and fourth sets of components are identical to the first and second sets of components, respectively, and (1) the third and fourth sets of components are oriented as mirror images of the first and second sets of components, respectively; (2) the third and fourth sets of components are connected to one another in the same manner as the first and second sets of components are connected to one another; and (3) the third and fourth sets of components are configured to be attached to the chassis in the same manner as the first and second sets of components, but on the opposite side of the chassis.

3. The apparatus of claim 2, further comprising a chassis of a vehicle, wherein the chassis of the vehicle is pivotally attached to each of the UTAs.

4. The apparatus of claim 3, further comprising a means for attaching the BPAs to the chassis of the vehicle.

5. The apparatus of claim 3, further comprising a substantially linear component that traverses the chassis of the vehicle and connects to each gear on the second end of each of the first BPA and the third BPA, respectively.

6. The apparatus of claim 3, further comprising one or more motors configured to induce rotation in one or more of the gears.

7. The apparatus of claim 3, further comprising a quantity of wheels equal to the quantity of drive shafts, wherein each of the wheels is configured to interact with one of the drive shafts.

8. The apparatus of claim 7, further comprising a first steering knuckle configured to interact with a first wheel, and a second steering knuckle configured to interact with a second wheel; wherein the second steering knuckle is situated substantially parallel to the first steering knuckle.

9. The apparatus of claim 8, further comprising a means for actuating the position of the steering knuckles.

10. The apparatus of claim 9, wherein the means for actuating the position of each steering knuckle comprises:
    (1) a steering servo arm;
    (2) a steering push-pull rod;
    (3) a bell crank; and
    (4) a tie rod; wherein the steering servo arm is connected to the steering push-pull rod, which is in turn connected to the bell crank, which is in turn connected to the tie rod, which is in turn connected to the steering knuckle, such that a change in a position of the steering servo arm results in a change in a position of the steering knuckle with which it is associated via the steering push-pull rod, bell crank and tie rod.

11. The apparatus of claim 10, further comprising:
    a first set of spring and damper (SD), comprising: (1) a first SD comprising a first end and a second end, and (2) a second SD, comprising a first end and a second end, wherein (a) the first end of the first SD is attached to a region near the first end of the first BPA; (b) the first end of the second SD is attached to a region near the first end of the second BPA; and (c) the second end of the first SD and the second end of the second SD are connected to one another; and
    a second set of SDs, comprising: (1) a third SD comprising a first end and a second end, and (2) a fourth SD, comprising a first end and a second end, wherein (a) the first end of the third SD is attached to a region near the first end of the third BPA; (b) the first end of fourth SD is pivotally attached to a region near the first end of the fourth BPA; and (c) the second end of the third SDA and the second end of the fourth SDA are connected to one another.

12. A kit, comprising:

mechanical components, comprising:

- a first belt-pulley-arm (BPA), comprising a first end, a second end, a central region, a long axis, a short axis, and a first gear, wherein the first gear is housed within and rotationally attached to a region near the second end of the BPA, and the axis of rotation of the gear is substantially perpendicular to the long axis of the BPA;
- a first geared-hub-arm (GHA), comprising a first end, a second end, a central region, and one or more first GHA gears housed within the first GHA, wherein one of the first GHA gears comprises a first drive shaft which is configured to interact with a first wheel of a vehicle;
- a first upper triangulated arm (UTA), comprising a first end, a second end, a central region, a long axis, and a short axis, wherein the second end of the first UTA is configured to attach to a chassis of the vehicle;
- a first belt; wherein (1) the first end of the first BPA is configured to pivotally attach to the central region of the first GHA; (2) the first end of the first UTA is configured to pivotally attach to the first end of the first GHA; (3) the first belt is configured to circumscribe the long axis of the first BPA, and is configured to associate rotational motion between the first gear of the first BPA and a gear of the first GHA;
- a second BPA, comprising a first end, a second end, a central region, a long axis, and a short axis;
- a second GHA, comprising a first end, a second end, a central region, and one or more second GHA gears housed within the second GHA, wherein one of the second GHA gears comprises a second drive shaft extending in the same direction as the first drive shaft and configured to interact with a second wheel of the vehicle;
- a second UTA, comprising a first end, a second end, a central region, a long axis, and a short axis, wherein the second end of the second UTA is configured to attach to the chassis on the same side as the first UTA; and
- a second belt; wherein (1) the first end of the second BPA is configured to pivotally attach to the central region of the second GHA; (2) the first end of the second UTA is configured to pivotally attach to the first end of the second GHA; (3) the second belt is configured to circumscribe the long axis of the second BPA, and is configured to associate rotational motion between the first gear of the first BPA and a gear of the second GHA; and (4) the second end of the second BPA and the second end of the first BPA are configured to pivotally attach to one another; and instructions for the use thereof.

* * * * *